(12) United States Patent
Susnjara et al.

(10) Patent No.: US 10,723,074 B1
(45) Date of Patent: Jul. 28, 2020

(54) PRINT HEAD FOR ADDITIVE MANUFACTURING

(71) Applicant: Thermwood Corporation, Dale, IN (US)

(72) Inventors: Kenneth J. Susnjara, Birdseye, IN (US); Brian S. Smiddy, Newburgh, IN (US); John Fuquay, Boonville, IN (US); Scott G. Vaal, Jasper, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 16/240,101

(22) Filed: Jan. 4, 2019

(51) Int. Cl.
| | | |
|---|---|---|
| *B29C 64/209* | (2017.01) | |
| *B29C 64/141* | (2017.01) | |
| *B29C 64/218* | (2017.01) | |
| *B29C 64/25* | (2017.01) | |
| *B29C 64/227* | (2017.01) | |
| *B33Y 30/00* | (2015.01) | |
| *B33Y 10/00* | (2015.01) | |

(52) U.S. Cl.
CPC .......... *B29C 64/209* (2017.08); *B29C 64/141* (2017.08); *B29C 64/218* (2017.08); *B29C 64/227* (2017.08); *B29C 64/25* (2017.08); *B33Y 10/00* (2014.12); *B33Y 30/00* (2014.12)

(58) Field of Classification Search
CPC ..... B29C 64/209; B29C 64/227; B29C 64/25; B29C 64/218; B29C 64/141; B33Y 10/00; B33Y 30/00
USPC ........................................................ 425/375
See application file for complete search history.

(56) References Cited

U.S. PATENT DOCUMENTS

| | | | | |
|---|---|---|---|---|
| 3,680,994 A | * | 8/1972 | Longenecker ......... | A21C 11/20 425/193 |
| 4,035,127 A | * | 7/1977 | Ogasawara .............. | D01D 1/04 425/192 S |
| 4,268,532 A | * | 5/1981 | Bernard ............... | A22C 11/001 426/231 |
| 7,731,816 B2 | | 6/2010 | Oldani et al. | |
| 7,810,539 B2 | | 10/2010 | Mischler et al. | |
| 8,151,854 B2 | | 4/2012 | Oldani | |
| 8,534,338 B2 | | 9/2013 | Oldani et al. | |
| 8,954,180 B2 | | 2/2015 | Oldani | |
| 9,969,122 B1 | | 5/2018 | Smiddy | |
| 2003/0066180 A1 | * | 4/2003 | Bassi .................... | B29C 31/048 29/430 |
| 2007/0044899 A1 | | 3/2007 | Tingley | |
| 2008/0006017 A1 | | 1/2008 | Rindels | |

(Continued)

OTHER PUBLICATIONS

International Search Report and Written Opinion in corresponding application PCT/US2019/055591, dated Jan. 28, 2020 (15 pages).

*Primary Examiner* — Seyed Masoud Malekzadeh
*Assistant Examiner* — Guy F Mongelli
(74) *Attorney, Agent, or Firm* — Bookoff McAndrews, PLLC (57) ABSTRACT

An additive manufacturing system may include a carrier, a set of rails coupled to the carrier, and a transition housing movably attached to the set of rails. The additive manufacturing system may include an extruder having an extruder barrel coupled to the transition housing, and a melt pump fixedly attached to the carrier. The melt pump may be in fluid communication with the extruder barrel. Additionally, the additive manufacturing system may include a nozzle in fluid communication with the melt pump, and a roller rotatable about the nozzle.

20 Claims, 6 Drawing Sheets

(56) References Cited

U.S. PATENT DOCUMENTS

| | | | |
|---|---|---|---|
| 2010/0021580 A1* | 1/2010 | Swanson | B29C 31/042 |
| | | | 425/132 |
| 2010/0043616 A1* | 2/2010 | Edelman | B26D 5/02 |
| | | | 83/591 |
| 2010/0200168 A1 | 8/2010 | Oldani et al. | |
| 2011/0109016 A1* | 5/2011 | Fuwa | B22F 3/1055 |
| | | | 264/460 |
| 2012/0251689 A1* | 10/2012 | Batchelder | A23G 1/0056 |
| | | | 426/383 |
| 2015/0108687 A1* | 4/2015 | Snyder | B29C 64/386 |
| | | | 264/308 |
| 2015/0137402 A1* | 5/2015 | Schmehl | B33Y 10/00 |
| | | | 264/39 |
| 2015/0209978 A1* | 7/2015 | Snyder | B29B 17/0026 |
| | | | 264/308 |
| 2016/0031155 A1* | 2/2016 | Tyler | B33Y 10/00 |
| | | | 264/129 |
| 2016/0096321 A1* | 4/2016 | Fry | B29C 67/0055 |
| | | | 425/375 |
| 2016/0193784 A1* | 7/2016 | Tadin | D01F 6/30 |
| 2016/0200024 A1* | 7/2016 | Kim | C08G 63/199 |
| 2016/0214175 A1* | 7/2016 | Nordstrom | B33Y 10/00 |
| | | | 264/129 |
| 2016/0297103 A1* | 10/2016 | Lee | D01F 6/30 |
| 2017/0066873 A1* | 3/2017 | Gardet | C08G 63/199 |
| 2018/0050502 A1 | 2/2018 | Oldani et al. | |
| 2018/0056602 A1 | 3/2018 | Susnjara et al. | |
| 2018/0236725 A1 | 8/2018 | Susnjara et al. | |

\* cited by examiner

PRINT HEAD FOR ADDITIVE MANUFACTURING

TECHNICAL FIELD

Aspects of the present disclosure relate to apparatus and methods for fabricating components. In some instances, aspects of the present disclosure relate to apparatus and methods for fabricating components (such as, e.g., automobile parts, medical devices, machine components, consumer products, etc.) via additive manufacturing techniques or processes, such as, e.g., three-dimensional (3D) printing.

BACKGROUND

Additive manufacturing techniques and processes generally involve the buildup of one or more materials, e.g., layering, to make a net or near net shape (NNS) object, in contrast to subtractive manufacturing methods. Though "additive manufacturing" is an industry standard term (ASTM F2792), additive manufacturing encompasses various manufacturing and prototyping techniques known under a variety of names, including, e.g., freeform fabrication, 3D printing, rapid prototyping/tooling, etc. Additive manufacturing techniques may be used to fabricate simple or complex components from a wide variety of materials. For example, a freestanding object may be fabricated from a computer-aided design (CAD) model.

A particular type of additive manufacturing is commonly known as 3D printing. One such process commonly referred to as Fused Deposition Modeling (FDM) or Fused Layer Modeling (FLM) comprises melting a thin layer of thermoplastic material, and applying this material in layers to produce a final part. This is commonly accomplished by passing a continuous thin filament of thermoplastic material through a heated nozzle, or by passing thermoplastic material into an extruder, with an attached nozzle, which melts it and applies the thermoplastic material and applies the melted thermoplastic material to the structure being printed, building up the structure. The heated material may be applied to the existing structure in layers, melting and fusing with the existing material to produce a solid finished part.

The filament used in the aforementioned process may be produced by, for example, using an extruder, which may include a steel extruder screw configured to rotate inside of a heated steel barrel. Thermoplastic material in the form of small pellets may be introduced into one end of the rotating screw. Friction from the rotating screw, combined with heat from the barrel may soften the plastic, which may then be forced under pressure through a small round opening in a die that is attached to the front of the extruder barrel. In doing so, a "string" of material may be extruded, after which the extruded string of material may be cooled and coiled up for use in a 3D printer or other additive manufacturing system.

Melting a thin filament of material in order to 3D print an item may be a slow process, which may be suitable for producing relatively small items or a limited number of items. The melted filament approach to 3D printing may be too slow to manufacture large items. However, the fundamental process of 3D printing using molten thermoplastic materials may offer advantages for the manufacture of larger parts or a larger number of items.

In some instances, the process of 3D printing a part may involve a two-step process. For example, the process may utilize a large print bead to achieve an accurate final size and shape. This two-step process, commonly referred to as near-net-shape, may begin by printing a part to a size slightly larger than needed, then machining, milling or routing the part to the final size and shape. The additional time required to trim the part to a final size may be compensated for by the faster printing process.

Print heads of additive manufacturing machines used to print thermoplastic material in relatively large beads have generally included a vertically mounted extruder flowably connected to a nozzle to deposit the bead of material through the nozzle onto a surface and/or a part being printed. These traditional print heads may include an oscillating plate surrounding the nozzle, the plate being configured to oscillate vertically to flatten the bead of material against the part or surface being printed on. Such traditional print heads may have several drawbacks including a tendency to trap air between layers as the layers are tapped together, uneven flow of material being printed, difficulty in servicing the machine (e.g., replacing extruder screws), and difficulty in scaling the machine to process material at a higher rate of throughput.

SUMMARY

Aspects of the present disclosure relate to, among other things, methods and apparatus for fabricating components via additive manufacturing or 3D printing techniques. Each of the aspects disclosed herein may include one or more of the features described in connection with any of the other disclosed aspects.

The additive manufacturing system disclosed herein may improve the ability to evenly bond adjoining layers of deposited material without trapping air between them, maintain even material flow at any print speed, permit easy removal and replacement of the extruder screw, and/or easy removal and replacement of the entire melt core (including a feed housing, extruder, and melt pump) with a larger or smaller melt core.

The additive manufacturing machine disclosed herein may include a carrier equipped with a servomotor and gearbox assembly. The servomotor and gearbox assembly may be slidably connected to the carrier, e.g., via one or more tracks. Additionally, or alternatively, the servomotor and gearbox assembly may be hingedly connected to the carrier so that the servomotor and gearbox assembly may swing clear of (e.g., so as not to cross) a longitudinal axis of the carrier. This servomotor and gearbox assembly may be coupled via a transition housing to a feed housing. The feed housing may be attached to the extruder barrel such that an extruder screw disposed inside the extruder barrel extends through the feed housing and attaches to the output shaft of the gearbox through a coupling.

The extruder barrel may be equipped with multiple heating elements. The heating elements may circumferentially surround at least a portion of the extruder barrel. Also, the extruder barrel may include or receive a plurality of thermocouples operably connected to a controller, e.g., via a transition box, to monitor and/or control the temperature of the extruder barrel at different heating zones along the extruder barrel. The output of the extruder barrel may be attached to the input of a melt pump (e.g., a polymer melt pump) so that material flowing from the extruder feeds into the melt pump. The melt pump may be operated by a servomotor, e.g., via a gearbox, thereby enabling the melt pump assembly to precisely meter the material to the nozzle (e.g., a heated nozzle) for deposition on a surface and/or the part being printed. As the nozzle moves, a roller may be directed by the controller to follow the nozzle so that the roller flattens and/or compresses the deposited material.

The melt pump may be attached (e.g., fixedly attached, bolted, etc.) to a bottom or underside of the carrier. Other components may be movably attached to one or more rails affixed to the carrier. For example, the extruder, the feed housing, a transition housing, a gearbox, and a servomotor driving the extruder, may be movably connected to the one or more rails. The components may be connected to the rails directly and/or via a support assembly. The applicator head, including the nozzle, may be coupled to the melt pump. Accordingly, the applicator head, along with the melt pump, may move with the carrier while other components of the print head (e.g., the extruder) may be displaced along the rails of the carrier. With the components configured in this manner, the movement of the applicator head, and thus the nozzle remains constant even if other components of the print head (e.g., the extruder) are displaced and/or replaced with a component of a different size.

Several components of the assembly, such as, e.g., the extruder servomotor, feed housing, melt pump gearbox mounting plate, and the roller in the applicator head assembly, may be cooled via a cooling system. The cooling system may include liquid cooling components and/or air cooling components. The cooling system may allow the print head to process materials at relatively high temperatures which might otherwise damage components. For example, the applicator head assembly may include a cooling system, or part thereof, to cool the roller. In such a cooling system, liquid may be passed into the applicator head through one or more passageways to an axle of the roller before returning to a chiller or other heat exchanger. By cooling the roller, materials commonly processed at higher temperatures, such as, e.g., polyphenylene sulfide (PPS), may adhere less to the roller during operation.

The cooling system may enable the roller to evenly bond adjoining layers and limit or eliminate air trapped between adjoining layers. Additionally, a duct system may cool a portion of the extruder barrel, e.g., via a blower surrounding a portion of the extruder barrel, to improve control over the temperature of molten material at the outlet of the extruder barrel.

The combination of the extruder and the melt pump, as opposed to only an extruder having no associated melt pump, may enable the additive manufacturing machine to utilize different extruder screw designs having different desirable characteristics, while maintaining even flow of material during operation. The melt pump may adjust the flow of material received from the extruder thereby compensating for changes in flow caused by replacing the extruder screw with a different design (e.g., a screw having a different pitch, length, or thread).

The configuration of the additive manufacturing machine may allow relatively easy removal and replacement of the extruder screw. For example, replacement of the extruder screw may begin by decoupling the extruder screw from the servomotor and gearbox assembly and decoupling the feed housing from the transition housing. The servomotor, gearbox and transition housing may be slid upward, e.g., along rails attached to the carrier, until the parts sufficiently clear the extruder screw. Then the entire mechanism may be rotated sufficiently to permit removal of the extruder screw.

This same configuration may allow relatively easy removal and replacement of the melt core (e.g., the feed housing, extruder, and melt pump assembly) of the additive manufacturing machine. Changing the melt core may alter the throughput of the print head. Removal of the melt core may begin with disconnecting the servomotor, the gearbox, and the transition housing assembly from the feed housing and the extruder screw. Then, the barrel heaters and thermocouples may be unplugged from the controller. Next, the servomotor, gearbox, and transition housing assembly may then slid upward along the rails of the carrier and secured. The melt pump may then be disconnected from the carrier so that the entire melt core may be removed. A different melt core (e.g., a different sized melt core) may be attached to the carrier in place of the previous melt core. Next, the barrel heaters and thermocouples may be replaced and plugged in to the controller. Then, the servomotor, gearbox, and transition housing assembly may be lowered and attached to the feed housing and extruder screw, respectively, to complete the replacement of the melt core.

In one embodiment of the present disclosure, an additive manufacturing system may include a carrier, a set of rails coupled to the carrier, and a transition housing movably attached to the set of rails. The additive manufacturing system may include an extruder having an extruder barrel coupled to the transition housing, and a melt pump fixedly attached to the carrier, the melt pump in fluid communication with the extruder barrel. Additionally, the additive manufacturing system may include a nozzle in fluid communication with the melt pump, and a roller rotatable about the nozzle.

In an additional or alternate embodiment of the present disclosure, an additive manufacturing system may include a CNC machine, a carrier supported by the CNC machine. The carrier may be movable along a plurality of axes. The additive manufacturing machine may include a set of rails mounted on the carrier, and an extruder drive assembly slidably attached to the set of rails. The extruder drive assembly may be operably coupled to an extruder. Also, the additive manufacturing machine may include a melt pump fixedly attached to the carrier, and a nozzle in fluid communication with the melt pump. The nozzle may be configured to receive a flowable material from the melt pump. Additionally, the additive manufacturing machine may include a roller.

In an additional or alternate embodiment of the present disclosure, a method of servicing an additive manufacturing system may include detaching an extruder drive assembly from an extruder, and moving the extruder drive assembly relative to the extruder along a set of rails mounted to a carrier. The method may further include replacing at least a part of the extruder and reattaching the extruder drive assembly to the extruder.

As used herein, the terms "comprises," "comprising," or any other variation thereof, are intended to cover a non-exclusive inclusion, such as a process, method, article, or apparatus. The term "exemplary" is used in the sense of "example," rather than "ideal." As used herein, the terms "about," "generally," "substantially," and "approximately," indicate a range of values within +/−5% of the stated value unless otherwise stated.

It may be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components, parts, or articles via additive manufacturing such as, e.g., 3D printing. Specifically, the methods and apparatus described herein comprise a print head configured to deposit material at a relatively constant flow rate under a variety of configurations, bond layers of deposited material together with minimal or no air trapped between layers, and permit ease of maintenance and replacement of parts.

For purposes of brevity, the methods and apparatus described herein will be discussed in connection with the fabrication of parts from thermoplastic materials. However, those of ordinary skill in the art will readily recognize that the disclosed apparatus and methods may be used with any flowable material suitable for additive manufacturing.

Figure 1:
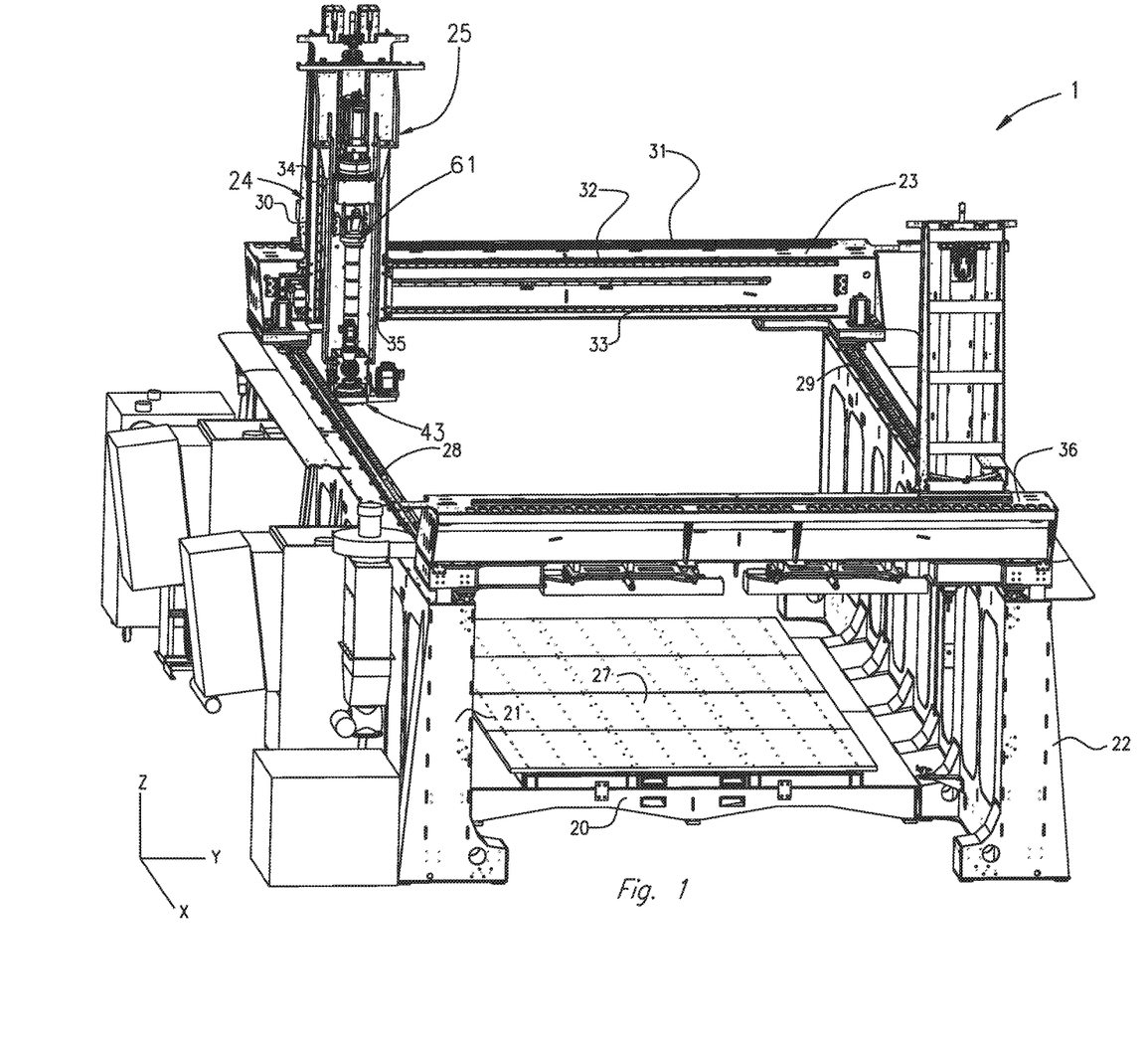
FIG. 1 is a perspective view of an exemplary CNC machine operable pursuant to an additive manufacturing process to form articles or parts, according to an aspect of the present disclosure.

Referring to FIG. 1, there is illustrated a CNC machine 1 embodying aspects of the present disclosure. CNC machine 1 may include a controller operatively connected to CNC machine 1 for displacing an applicator head 43 and a print head 99 (FIG. 2) along a longitudinal line of travel, or x-axis, a transverse line of travel, or a y-axis, and a vertical line of travel, or z-axis, in accordance with a program, (e.g., a CNC program) inputted or loaded into the controller for performing an additive manufacturing process to form a desired component, as will be described in further detail below. CNC machine 1 may be configured to print or otherwise build 3D parts from digital representations of the 3D parts (e.g., AMF and STL format files).

For example, in an extrusion-based additive manufacturing system (e.g., a 3D printing machine), a 3D part may be printed from a digital representation of the 3D part in a layer-by-layer manner by extruding a flowable material (e.g., thermoplastic material with or without reinforcements). The flowable material may be extruded through an extrusion tip or nozzle 51 (FIGS. 3 and 4) carried by applicator head 43 of the machine 1, and the flowable material may be deposited as a sequence of beads or layers on a substrate in an x-y plane. The extruded, flowable material may fuse to a previously deposited layer of material and may solidify upon a drop in temperature. The position of applicator head 43 relative to the substrate may then be incrementally advanced along a z-axis (perpendicular to the x-y plane), and the process may then be repeated to form a 3D part resembling the digital representation.

CNC machine 1, as shown in FIG. 1, includes a bed 20 provided with a pair of transversely spaced side walls 21 and 22, a printing gantry 23 and a trimming gantry 36 supported on opposing side walls 21 and 22, a carriage 24 mounted on printing gantry 23, a carrier 25 mounted on carriage 24, an extruder 61, and applicator head 43 mounted on carrier 25. Located on bed 20 between side walls 21 and 22 is a worktable 27 provided with a support surface. The support surface may be disposed in an x-y plane and may be fixed, or displaceable, along an x-axis and/or a y-axis. For example, in a displaceable version, worktable 27 may be displaceable along a set of rails mounted to bed 20. Displacement of worktable 27 may be achieved using one or more servomotors and one or more of guide rails 28 and 29 mounted on bed 20 and operatively connected to worktable 27. Printing gantry 23 is disposed along the y-axis, supported on side walls 21 and 22. In FIG. 1, printing gantry 23 is mounted on the set of guide rails 28 and 29, which are located along a top surface of side walls 21 and 22. In some examples, the CNC machine 1 may include a vertical worktable (not shown). The vertical worktable may be attached to the worktable 27, bed 20, or the support surface and/or rails of worktable 27, as described above.

Printing gantry 23 may either be fixedly or displaceably mounted, and in some aspects, printing gantry 23 may be disposed along the x-axis. In an exemplary displaceable version, one or more servomotors may control movement of printing gantry 23. For example, one or more servomotors may be mounted on printing gantry 23 and operatively connected to tracks, e.g., guide rails 28, 29, provided on the side walls 21 and 22 of bed 20.

Carriage 24 may supported on printing gantry 23 and may be provided with a support member 30 mounted on and displaceable along one or more guide rails 31, 32 and 33 provided on printing gantry 23. Carriage 24 may be displaceable along the y-axis on one or more guide rails 31, 32 and 33 by a servomotor mounted on the printing gantry 23 and operatively connected to support member 30. Carrier 25 may be mounted on one or more vertically disposed guide rails 34 and 35 supported on carriage 24 for displacement of carrier 25 relative to carriage 24 along the z-axis. Carrier 25 may be displaceable along the z-axis by a servomotor mounted on carriage 24 and operatively connected to carrier 25.

Figure 2:
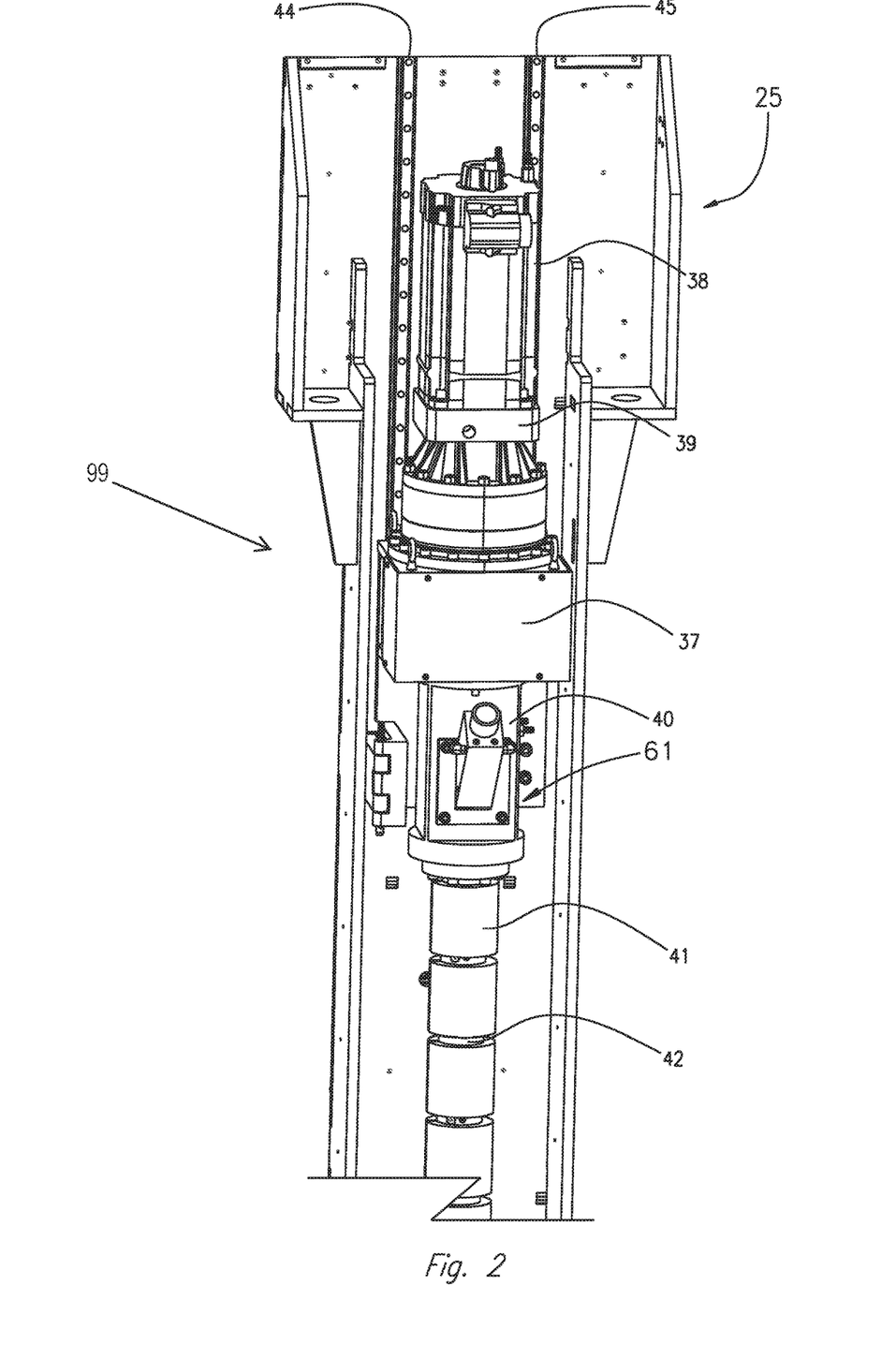
FIG. 2 is an enlarged perspective view of an exemplary carrier and extruder of the exemplary CNC machine shown in FIG. 1.

As shown in FIG. 2, a print head assembly 99 may include carrier 25 and one or more components attached to carrier 25 including, but not limited to, one or more rails (e.g., rails 44 and 45), extruder 61, a gearbox 39, a servomotor 38, and a transition housing 37. Print head assembly 99 may include additional components as described below. Extruder 61 may include a feed housing 40 and an extruder barrel 42. Extruder 61 may be driven, by servomotor 38, which may be operatively connected to extruder screw 80 (FIG. 5) via gearbox 39. Gearbox 39 may be physically and/or operably attached to extruder 61 by a transition housing 37. Transition housing 37 may be detachably connected to extruder 61, e.g., via extruder barrel 42. As discussed further below, transition housing 37, gearbox 39, and servomotor 38 may be collectively referred to as the "extruder drive assembly." The extruder drive assembly may be movably, e.g., slidably, attached to rails 44 and 45 mounted on carrier 25. In some examples, extruder 61 may be movably attached to rails 44 and 45. Optionally, one or more components of print head assembly 99 may be attached to rails 44 and 45 via a support assembly. The support assembly may be movable along rails 44 and 45 in line with a longitudinal axis of carrier 25. The support assembly may include a hinge or other mechanism permitting rotation of one or more components attached to the support assembly. For example, the extruder drive assembly may be coupled to a portion of the support assembly (e.g., via transition housing 37) such that the portion of the support assembly supporting the extruder drive assembly is rotatable with respect to carrier 25 (e.g., rotatable along a longitudinal axis offset from the longitudinal axis of carrier 25). The support assembly may be configured to move and rotate the extruder drive assembly so that the extruder drive assembly clears space for the removal and/or maintenance of extruder 61, as will be described in further detail below.

With continued reference to FIG. 2, one or more heaters 41 may surround at least a portion of extruder barrel 42, as shown. In some embodiments, heaters 41 may circumferentially surround a portion of extruder barrel 42. Heaters 41 may be disposed along a portion or along the entire length of extruder barrel 42.

A material (e.g., thermoplastic material) may be introduced into an opening of feed housing 40. Those of ordinary skill will recognize that the material may be of any suitable material, for example, thermoplastic material, and that the material may be delivered to extruder barrel 42 in any suitable size and/or configuration, e.g., as pellets. In an exemplary embodiment, the material introduced into extruder barrel 42 may be heated by the friction generated from rotation of extruder screw 80 (FIG. 5) and/or by one or more heaters 41 disposed along the length of extruder barrel 42. In an exemplary embodiment, once the material has melted, the molten material may be forced under pressure by extruder screw 80 further into extruder barrel 42 and out of a terminal end or bottom opening of extruder barrel 42. Next, the flowable material may be delivered to nozzle 51 (FIGS. 3 and 4) to be deposited, as further described below.

Figure 3:
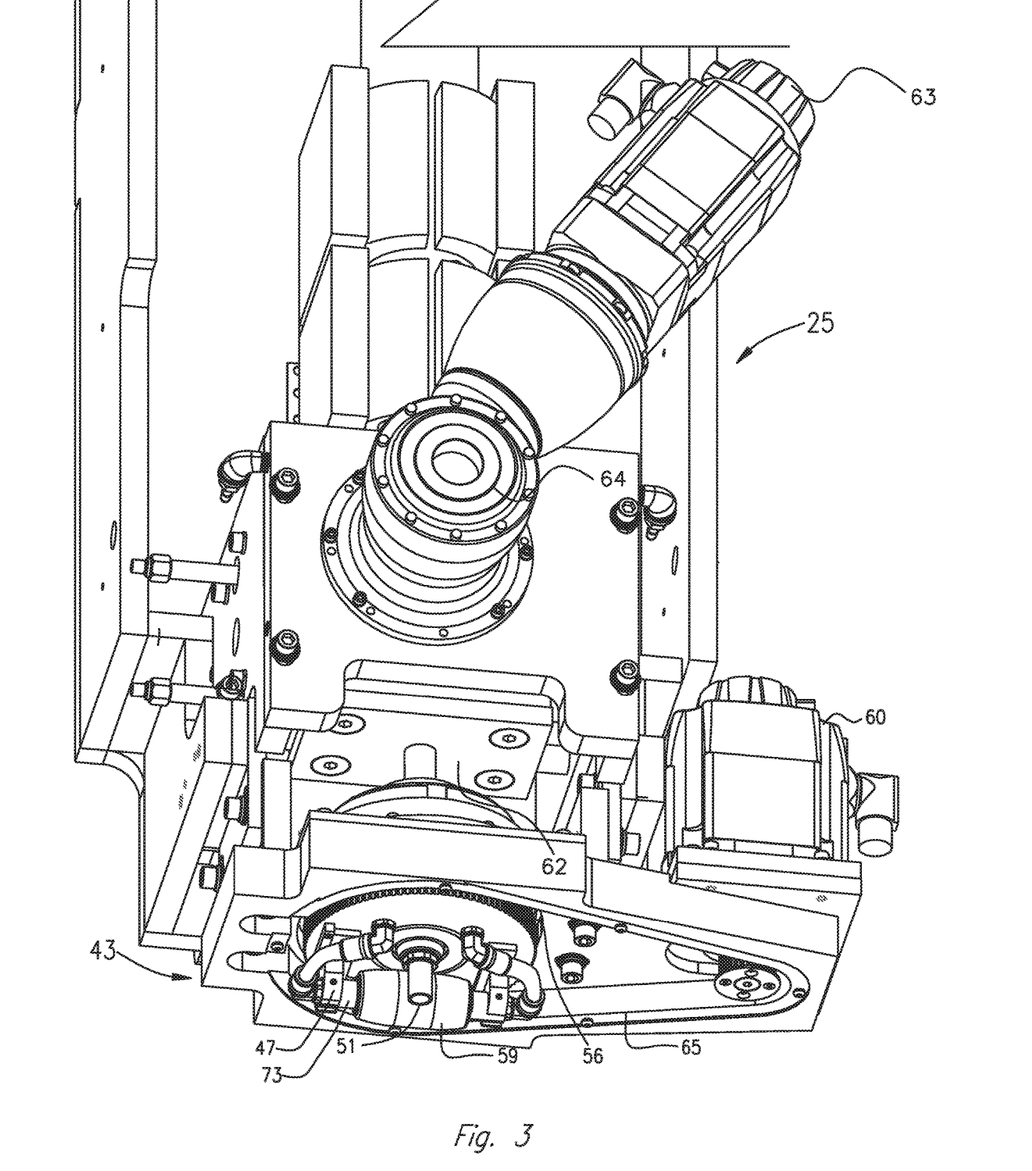
FIG. 3 is an enlarged perspective view of an exemplary carrier and applicator head assembly of the exemplary CNC machine shown in FIG. 1.

As shown in FIG. 3, also mounted to carrier 25 (e.g., fixedly mounted to carrier 25) may be a positive displacement melt pump 62 (e.g., a gear pump) which may be driven by a servomotor 63, through a gearbox (not shown). Melt pump 62 may be in fluid communication with extruder barrel 42 to receive molten plastic from extruder 61, shown in FIG. 2, and meter out precise amounts of material at a controlled flow rate to nozzle 51 so as to print the part or component. The combination of extruder 61 and melt pump 62 may enable CNC machine 1 to utilize different extruder screws 80 having different desirable characteristics. For example, CNC machine 1 may be configured to use various extruder screws 80 having different characteristics including, but not limited to, length, pitch, helix angle, diameter, root, channel depth, channel width, channel flight, pushing flight, and trailing flight. Different extruder screws 80 may produce different material flow rates of material being extruded. Melt pump 62 may enable and/or maintain a relatively constant flow rate of material provided to nozzle 51 regardless of the extruder screw 80 used. For example, melt pump 62 may increase and/or decrease the flow rate of material sent to nozzle 51 in order to compensate for the flow rate of material received from extruder 61.

Figure 4:
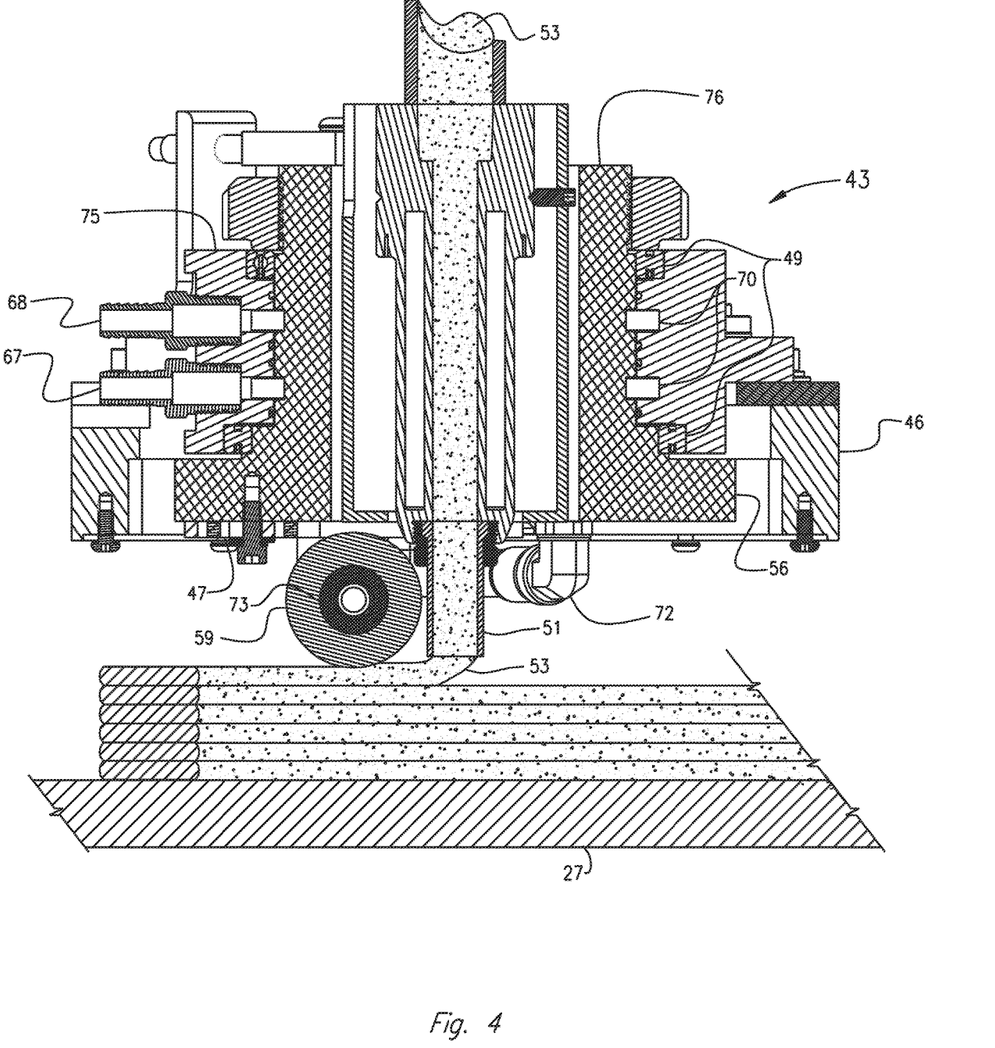
FIG. 4 is an enlarged cutaway view of the exemplary applicator head assembly shown in FIG. 3.

With reference to FIGS. 3 and 4, applicator head 43 may include a housing 46 having a rotary union mounted therein. Such a rotary union may include an inner hub 76 rotatably mounted within and relative to an outer housing 75. For example, inner hub 76 may rotate about a longitudinal axis thereof relative to outer housing 75 via one or more roller bearings 49. A carrier bracket 47 may be mounted, e.g., fixedly mounted to inner hub 76, journaled in roller bearing 49. Roller bearing 49 may allow roller 59 to rotate about nozzle 51.

Roller 59 may be oriented tangentially to nozzle 51. Roller 59 may be mounted relative to nozzle 51 so that material, e.g., one or more beads of flowable material (such as thermoplastic), discharged from nozzle 51 are smoothed, flattened, leveled, and/or compressed by roller 59, as depicted in FIG. 4. One or more servomotors 60 (FIG. 3) may be configured to move, e.g., rotationally displace, carrier bracket 47 via a pulley 56 and belt 65 arrangement. In some embodiments, carrier bracket 47 may be rotationally displaced via a sprocket and drive-chain arrangement (not shown), or by any other suitable mechanism.

In some arrangements, roller 59 may be removably mounted to CNC machine 1. For example, different sized or shaped rollers 59 may be interchangeably mounted on CNC machine 1, depending on, e.g., the type of material 53 and/or desired characteristics of the rows (e.g., plies) of deposited flowable material formed on worktable 27.

In the course of fabricating an article or component, pursuant to the methods described herein, the controller of CNC machine 1, in executing the inputted program, may control several servomotors described above to displace gantry 23 along the x-axis, displace carriage 24 along the y-axis, displace carrier 25 along the z-axis, and/or rotate carrier bracket 47 about the z-axis while nozzle 51 deposits material 53 and roller 59 compresses the deposited material 53. In some embodiments, roller 59 may compress material 53 in uniform, smooth rows.

A circumferential outer surface of inner hub 76 may include or define a pulley 56. For example, as shown in FIG. 3, pulley 56 may include a radially outward-most portion of inner hub 76. Although pulley 56 is depicted as being integral with inner hub 76, pulley 56 may be separate and discrete from inner hub 76. Additionally, inner hub 76 may include an opening having a dimension (e.g., diameter) sufficient to allow nozzle 51 to pass therethrough.

Outer housing 75 may include one or more barb fittings 67, 68. Coolant may enter a barb fitting 67 and may be introduced inside of housing 46 of applicator head 43. Each barb fitting 67 and 68 may be fluidly coupled to one or more passages extending through applicator head 43. For example, each of barb fittings 67 and 68 may be coupled to one or more coolant passages 70. As shown in FIG. 4, coolant passages 70 may extend between outer housing 75 and inner hub 76. Additionally, coolant passages 70 may couple to quick connect fitting 72. Quick connect fitting 72, in turn, may be fluidly coupled to an interior bore, passage, or lumen extending through the axle 73 to directly cool the axle 73, and thereby, roller 59. Each coolant passage 70 may be disposed within applicator head 43 to direct the coolant within applicator head 43 during operation of CNC machine 1, e.g., when printing a part.

Regardless of the configuration, orientation, shape, or arrangement thereof, barb fitting 67, coolant passages 70, quick connect fitting 72, axle 73, and barb fitting 68 may collectively form a cooling circuit for cycling or otherwise introducing and removing coolant from applicator head 43. For example, an inlet portion of barb fitting 67 may be fluidly connected to a source of coolant (not shown). Once within applicator head 43, the coolant may absorb heat and may cool outer housing 75, inner hub 76, and axle 73 as it flows therethrough. In addition, due to the proximity of roller 59 to axle 73, passage of coolant through axle 73 may result in likewise cooling of roller 59. The coolant may exit from one or more barb fittings 68 and may return to a chiller to be cooled back down to an appropriate temperature.

The coolant may be cooled down to a temperature below that at which deposited material 53 may begin to adhere to roller 59. This temperature may vary depending on the type of material 53 used and may be below the melting point of that material 53. For example, cooling the axle 73, and thereby roller 59, to an operating temperature may reduce adhesion to the roller 59 by certain materials processed at relatively high temperatures, such as, e.g., polyphenylene sulfide (PPS). In some examples, the coolant may be a liquid coolant, such as, e.g., water, antifreeze, ethylene glycol, diethylene glycol, propylene glycol, betaine, or any other suitable liquid coolants or combinations thereof. The cooling system may enable the roller 59 to compress deposited material 53 so that adjoining layers are smoothly and evenly bonded together with little or no air trapped between layers.

Figure 5:
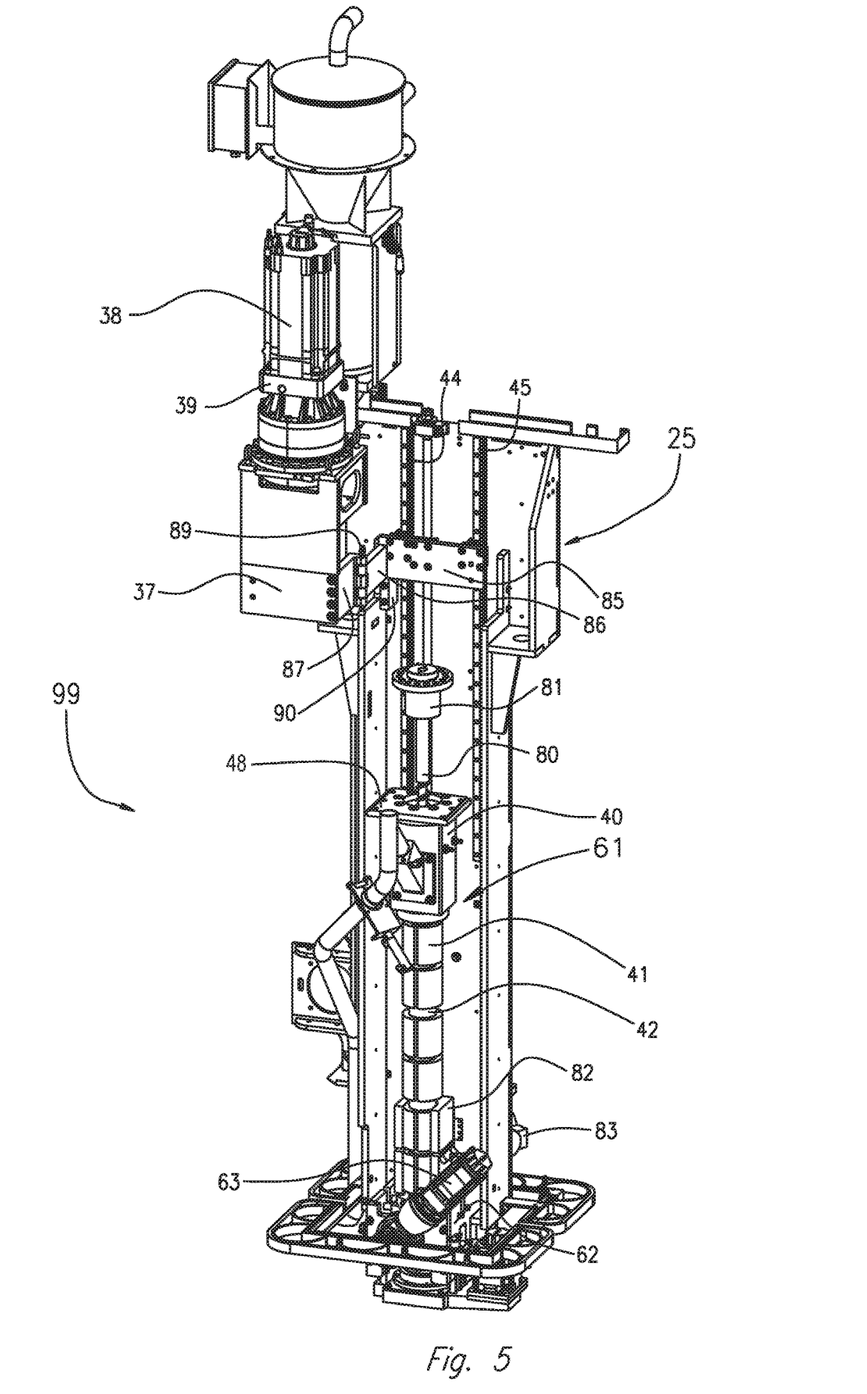
FIG. 5 is a perspective view of the exemplary carrier and extruder shown in FIG. 2.

Additionally, or alternatively, the cooling system may include one or more components configured to air cool part of the additive manufacturing machine. With reference to FIG. 5, a portion of the extruder barrel 42 and at least a portion of one or more heaters 41 (e.g., two heaters 41) may be contained within a duct system 82 mounted along the extruder barrel 42. The duct system 82 may circumferentially surround and/or enclose a portion of the extruder barrel 42 and/or a portion of one or more heaters 41. The duct system 82 may cool a portion of the extruder barrel using a blower 83. The blower 83 may include a fan or other devices for circulating and/or cooling air. The duct system 82 may be attached to the carrier 25 and/or the extruder 61 adjacent the melt pump 62. The blower 83 may be coupled to the carrier 25 opposite the servomotor 63 that drives the melt pump 62. The duct system 82 may improve control of the temperature of material 53 at the distal or output end of the extruder 61. For example, the duct system 82 may prevent the material within the extruder 61 from raising above a specific temperature, including, but not limited to, an operating temperature or a temperature at which the flowable material 53 will burn-on the extruder 61 and/or melt pump 62.

With continued reference to FIG. 5, print head assembly 99 of CNC machine 1 may collectively refer to carrier 25 and the components of machine 1 connected thereto. For example, print head assembly 99 may include one or more of extruder 61, gearbox 39, servomotor 38, feed housing 40, duct system 82, melt pump 62, applicator head 43 (FIG. 4), and/or nozzle 51 (FIG. 4). Melt pump 62 may be fixedly attached to a bottom portion of the carrier 25. Other components of print head 99 (e.g., extruder 61, transition housing 37, servomotor 38, and gearbox 39) may be movable via a set of rails 44 and 45 mounted to carrier 25. Therefore, as components of the CNC machine 1 are replaced to operate CNC machine 1 at different output levels (which may be measured in lbs./hr., for example), the height of the nozzle 51 may be kept constant with respect to carrier 25 even if the length(s) and/or height(s) of one or more of extruder barrel 42, extruder screw 80, transition housing 37, servomotor 38, and gearbox 39 change. Keeping the height of the nozzle 51 constant with respect to the carrier through various configurations of the CNC machine 1 may reduce the complexity and steps involved in changing the operating parameters of CNC machine 1, e.g., a tool path and/or movement of nozzle 51.

As noted above, the extruder drive assembly may be attached to rails 44 and 45 via a support assembly. The support assembly may include a hinge or other mechanism permitting rotation of the extruder drive assembly offset from a longitudinal axis of extruder 61 and/or carrier 25. Additionally, the support assembly may include one or more bearings to permit movement along rails 44 and 45.

As shown in FIG. 5, for example, the support assembly may include a hinge that is movably attached to rails 44 and 45 via a support plate 85. The support plate 85 of the support assembly may be slidably connected to rails 44 and 45, for example by one or more sliding bearings. The hinge may include a pair of hinge leafs 86 and 87 and a hinge pin 89. Hinge leaf 86 may be fixedly coupled to support plate 85. Hinge leaf 87 may connect hinge leaf 86 to transition housing 37 via a hinge pin 89. Hinge leaf 87 may be rotatably movable between an open position (FIG. 5) and a closed position (FIG. 2), and may rotate up to 180 degrees. Thus, hinge pin 89 may provide an axis about which the extruder drive assembly may rotate that is offset from a longitudinal axis of extruder 61 and/or carrier 25, as can be seen in FIG. 5. A removable stop block 90 may be employed to lock the support plate 85 at a particular vertical position on rails 44 and 45 before hinge leaf 87 is rotated from the closed position to the open position.

Hinge leaf 87 may be rotated about an axis defined by hinge pin 89 to open or close the hinge. When in a closed position, inner wall surfaces of hinge leafs 86 and 87 are brought adjacent to, and/or into contact with, each other, and a rear surface of transition housing 37 is brought adjacent to and/or into contact with, support plate 85. As can be seen in FIG. 5, transition housing 37, servomotor 38, and gearbox 39 may be rotatable together with hinge leaf 87. A fastener such as a bolt may be used to fix transition housing 37 to support plate 85 in the closed position.

The configuration of CNC machine 1 may facilitate servicing of CNC machine 1 and/or replacement of one or more components of CNC machine 1. For example, extruder screw 80 may be replaced with a different extruder screw 80 having the same or different characteristics. A method of removing extruder screw 80, may begin by detaching extruder screw coupling 81 from the servomotor 38 and gearbox 39 assembly and detaching the feed housing plate 48 from the transition housing 37. Then, the extruder drive assembly (e.g., the servomotor 38, gearbox 39, and transition housing 37) may be slid along rails 44 and 45 to clear the extruder screw 80. Next, the extruder drive assembly may be rotated to allow the removal of the extruder screw 80 and screw coupling 81. For example, the extruder drive assembly may be rotated by removing a bolt fixing transition housing 37 to support plate 85 and rotating hinge leaf 87 with the extruder drive assembly, providing a removal path for extruder screw 80 and screw coupling 81 that does not interfere with the extruder drive assembly.

With continued reference to FIG. 5, a method of servicing CNC machine 1 and/or replacing components thereof may include removal and replacement of a melt core of the print head 99. The melt core includes feed housing 40, extruder 61, and melt pump 62. The components of the melt core may determine the throughput of the print head. A method of removing and replacing the melt core may include detaching servomotor 38, gearbox 39, and transition housing 37 from extruder screw 80 and feed housing 46. Next, heaters 41, and one or more thermocouples, may be disconnected from the controller. Then, the extruder drive assembly (servomotor 38, gearbox 39, and transition housing 37) may be moved along rails 44 and 45 and secured in a new location. For example, the extruder drive assembly may be slid upwards along rails 44 and 45 with support plate 85. Next, melt pump 62 may be disconnected from the carrier 25. The melt core or a component thereof may be removed. A different melt core (or component thereof) may be positioned in the print head 99, and attached to the melt pump 62 and/or the carrier 25. Next, heaters 41, and one or more thermocouples may be reconnected to the controller. Then, the servomotor 38, gearbox 39, and transition housing 37 may be moved along rails 44 and 45, for example by sliding support plate 85, and attached to the feed housing plate 48 and extruder screw 80.

Figure 6A:
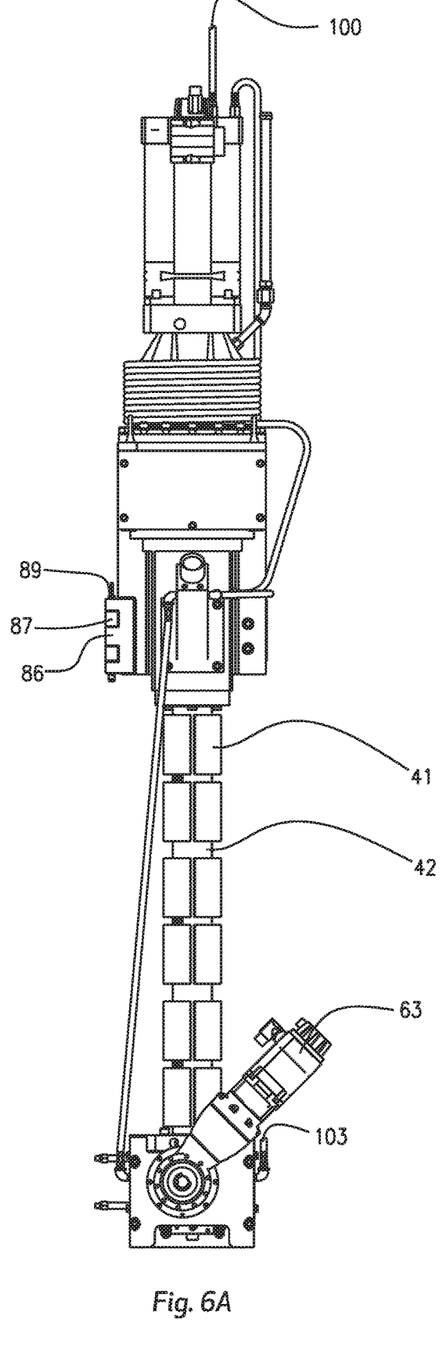
FIG. 6A is a side view of the exemplary carrier and extruder shown in FIG. 2.
Figure 6B:
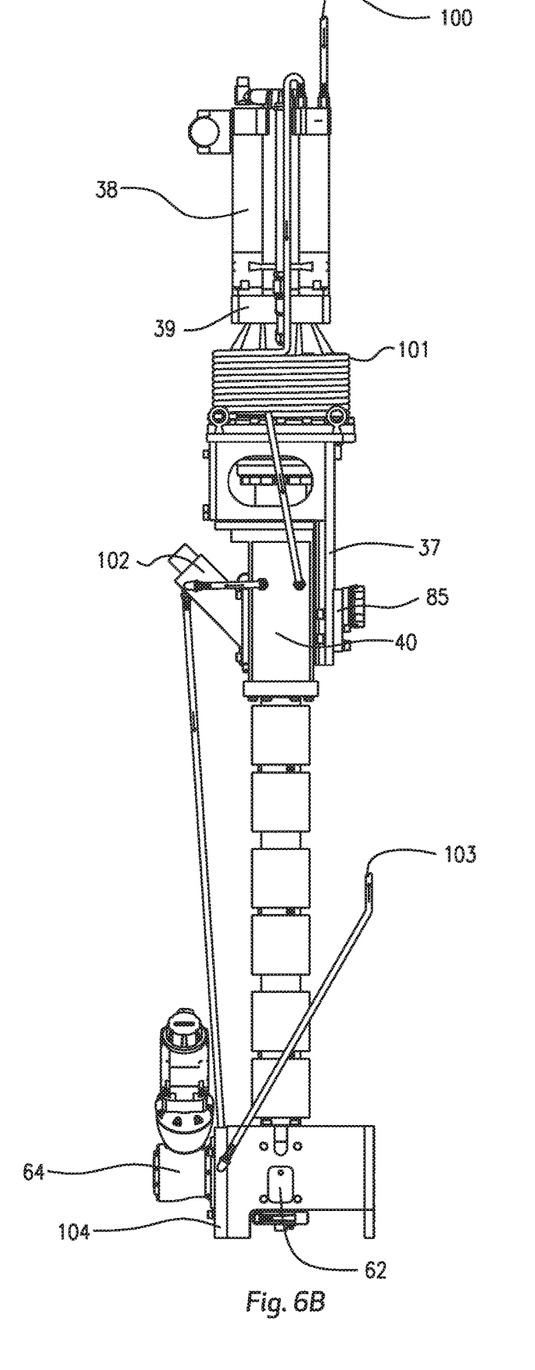
FIG. 6B is a rear view of the exemplary carrier and extruder shown in FIG. 2.

With reference to FIGS. 6A and 6B, a second liquid cooling system may extend from an inlet 100 connected to servomotor 38. The second liquid cooling system may include a gearbox cooling coil 101 disposed around gearbox 39 and continue along a path to, feed housing 40, a feed throat 102, and a melt pump gearbox mount plate 104. The second liquid cooling system may also include an exit 103 which provides a return path to a chiller or other heat exchanger. The second liquid cooling system may provide liquid coolant to one or more components of the assembly, such as the extruder servomotor (e.g., servomotor 38), feed housing 40, and one or more components within melt pump gearbox mounting plate 104. A coolant, such as a liquid coolant, may include water, antifreeze, ethylene glycol, diethylene glycol, propylene glycol, betaine, or any other suitable liquid coolants or combinations thereof.

Coolant may enter through inlet 100 to cool servomotor 38 and travel within gearbox cooling coil 101 to cool gearbox 39. Coolant may then enter a path internal to feed housing 40, as shown in FIG. 6B. Next, coolant may exit feed housing 40 and pass into a path within or along feed throat 102 before entering melt gearbox mounting plate 104. After exiting an interior of melt gearbox mounting plate 104, coolant may return to the chiller or other heat exchanger via exit 103. Additional components may be cooled by the second liquid cooling system. Additionally, the second liquid cooling system may include a plurality of separate and/or independent coolant systems.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing system, comprising:
   a carrier;
   a set of rails coupled to the carrier;
   a transition housing movably attached to the set of rails by a hinge;
   an extruder having an extruder barrel detachably coupled to the transition housing;
   a servomotor coupled to the transition housing and configured to drive the extruder, wherein the transition housing and the servomotor are configured to rotate with a leaf of the hinge;
   a gear pump fixedly attached to the carrier, wherein the gear pump is in fluid communication with the extruder barrel;
   a nozzle in fluid communication with the gear pump; and
   a roller configured to rotate about the nozzle.

2. The additive manufacturing system of claim 1, further including:
   an extruder screw disposed within the extruder barrel;
   a gearbox configured to be connected to the extruder;
   wherein the transition housing, the gearbox, and the servomotor are configured to rotate together with the leaf of the hinge about an axis that is offset from a longitudinal axis of the extruder.

3. The additive manufacturing system of claim 1, wherein the extruder includes a feed housing, and wherein the extruder barrel is configured to be coupled to the transition housing via the feed housing.

4. The additive manufacturing system of claim 1, wherein the extruder is movably connected to the set of rails.

5. The additive manufacturing system of claim 1, further including:
   a duct at least partially surrounding a portion of the extruder barrel.

6. The additive manufacturing system of claim 5, wherein the duct is positioned adjacent to an output end of the extruder barrel.

7. The additive manufacturing system of claim 1, further including a cooling passage fluidly connected to the gear pump.

8. An additive manufacturing system, comprising:
   a CNC machine including:
   a carrier supported by the CNC machine, the carrier being movable along a plurality of axes;
   a set of rails mounted on the carrier;
   an extruder drive assembly slidably attached to the set of rails, the extruder drive assembly including a servomotor operably coupled to an extruder and a transition housing, wherein the servomotor and the transition housing of the extruder drive assembly are configured to rotate together, with a leaf of a hinge, about an axis that is offset from a longitudinal axis of the extruder;
   a gear pump fixedly attached to the carrier;
   a nozzle in fluid communication with the gear pump, the nozzle being configured to receive a flowable material from the gear pump; and
   a roller.

9. The additive manufacturing system of claim 8, further including a duct configured to cool a portion of the extruder.

10. The additive manufacturing system of claim 9, further including a cooling passage configured to cool the roller.

11. The additive manufacturing system of claim 8, wherein the extruder drive assembly is attached to the set of rails via the hinge.

12. The additive manufacturing system of claim 8, wherein the gear pump is detachably coupled to the extruder.

13. The additive manufacturing system of claim 8, wherein the gear pump and the extruder are configured to deposit material through the nozzle at a substantially constant flow rate.

14. The additive manufacturing system of claim 8, wherein the transition housing is removably coupled to the extruder.

15. The additive manufacturing system of claim 14, wherein the transition housing is removably coupled to a feed housing of the extruder.

16. The additive manufacturing system of claim 14, wherein the extruder screw is removable from an end of the extruder that includes a feed housing having a plate configured to face the transition housing.

17. The additive manufacturing system of claim 1, wherein the leaf of the hinge is a first hinge leaf, and wherein the servomotor and transition housing are rotatable with respect to a hinge pin that extends through the first hinge leaf and a second hinge leaf of the hinge.

18. The additive manufacturing system of claim 1, further including an extruder screw disposed within the extruder barrel, wherein the transition housing and the servomotor are configured to rotate with the hinge to a position offset from the extruder screw within the extruder barrel.

19. The additive manufacturing system of claim 1, wherein, when the servomotor is rotated with the leaf of the hinge to the position offset from the extruder screw, the extruder screw is removable from the extruder in a removal direction, wherein the removal direction extends toward a position of the servomotor prior to the rotation of the servomotor with the leaf of the hinge.

20. The additive manufacturing system of claim 1, further including:
- an extruder screw disposed within the extruder barrel; and
- a gearbox, wherein the transition housing and the servomotor are configured to rotate with the leaf of the hinge to an open position offset from the extruder screw and to a closed position where the extruder screw is configured to be connected to the gearbox.

* * * * *